US010503380B2

(12) United States Patent
Woo et al.

(10) Patent No.: US 10,503,380 B2
(45) Date of Patent: Dec. 10, 2019

(54) APPARATUS AND METHOD FOR CONTROLLING A SCREEN DISPLAY IN PORTABLE TERMINAL

(71) Applicant: Samsung Electronics Co., Ltd., Gyeonggi-do (KR)

(72) Inventors: Hyun-Chul Woo, Daegu (KR); Moon-Ki Huh, Gyeonggi-do (KR); Jung-Sik Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/953,251

(22) Filed: Nov. 27, 2015

(65) Prior Publication Data
US 2016/0077729 A1 Mar. 17, 2016

Related U.S. Application Data

(63) Continuation of application No. 13/335,687, filed on Dec. 22, 2011, now Pat. No. 9,229,631.

(30) Foreign Application Priority Data

Dec. 29, 2010 (KR) .................. 10-2010-0137448

(51) Int. Cl.
*G06F 3/01* (2006.01)
*G06F 3/0484* (2013.01)
(Continued)

(52) U.S. Cl.
CPC .......... *G06F 3/04847* (2013.01); *G06F 3/017* (2013.01); *G06F 3/0481* (2013.01);
(Continued)

(58) Field of Classification Search
CPC ..... G06T 3/40; G06F 3/04842; G06F 3/0482; G06F 3/0481; G06F 3/04847;
(Continued)

(56) References Cited

U.S. PATENT DOCUMENTS 6,201,554 B1 3/2001 Lands
7,508,374 B2 3/2009 Tsunoda
(Continued)

FOREIGN PATENT DOCUMENTS

CN 1379871 A 11/2002
CN 101213509 A 7/2008
(Continued)

OTHER PUBLICATIONS

Extended European Search Report dated Sep. 30, 2015 in connection with European Patent Application No. EP 11193370.1; 10 pages.
(Continued)

*Primary Examiner* — Robert J Craddock

(57) ABSTRACT

An apparatus and method for controlling a screen display in a portable terminal are provided. The apparatus includes a display unit, an input unit, a memory unit, a magnification identifying unit, and a controller. The display unit displays a screen display having a controlled magnification level. The input unit sets a zoom-in or zoom-out point on the screen display. The memory unit stores reference information for determining a zoom-in or zoom-out magnification level of the screen display. The magnification identifying unit measures a tilt of the portable terminal, and determines control or non-control of a magnification level of the screen display using the measured tilt. The controller controls the screen display according to the identified magnification level.

12 Claims, 7 Drawing Sheets

(51) Int. Cl.
*G06T 3/40* (2006.01)
*G06F 3/0481* (2013.01)
*G06F 3/0488* (2013.01)

(52) U.S. Cl.
CPC ............ *G06F 3/04883* (2013.01); *G06T 3/40* (2013.01); *G06F 2203/04806* (2013.01); *G06F 2203/04808* (2013.01)

(58) Field of Classification Search
CPC ................. G06F 3/017; G06F 3/04883; G06F 2203/04806; G06F 2203/04808
USPC ........................................................ 345/660
See application file for complete search history.

(56) References Cited

U.S. PATENT DOCUMENTS

| | | | |
|---|---|---|---|
| 8,587,617 | B2 | 11/2013 | Hoff et al. |
| 8,952,993 | B2 | 2/2015 | Suzuki et al. |
| 2002/0030699 | A1 | 3/2002 | Van Ee |
| 2009/0006938 | A1* | 1/2009 | Yoo .................. G06F 17/30899 715/205 |
| 2009/0066730 | A1* | 3/2009 | Mikawa .................... G06T 3/40 345/661 |
| 2009/0091542 | A1 | 4/2009 | Inaba et al. |
| 2009/0195519 | A1 | 8/2009 | Chou |
| 2009/0303204 | A1 | 12/2009 | Nasiri et al. |
| 2010/0058254 | A1 | 3/2010 | Narita |
| 2010/0063769 | A1 | 3/2010 | Egedal |
| 2010/0134312 | A1 | 6/2010 | Park et al. |
| 2010/0194784 | A1 | 8/2010 | Hoff et al. |
| 2010/0275150 | A1 | 10/2010 | Chiba et al. |

FOREIGN PATENT DOCUMENTS

| | | |
|---|---|---|
| CN | 101383141 A | 3/2009 |
| CN | 101872607 A | 10/2010 |
| JP | 2001211408 | 8/2001 |
| JP | 2003-511786 | 3/2003 |
| JP | 2005025170 | 1/2005 |
| JP | 2010055511 | 3/2010 |
| KR | 20090002323 A | 1/2009 |
| KR | 20100063769 A | 6/2010 |
| WO | WO 01/27735 A1 | 4/2001 |
| WO | WO 2009/044770 | 4/2009 |

OTHER PUBLICATIONS

Details of the First Office Action dated Oct. 30, 2015 in connection wiht Chinese Patent Application No. CN 201110435619.1; 23 pages.
Japanese Office Action issued for JP 2011-281311 dated Jan. 26, 2016, 9 pgs.
State Intellectual Property Office of the P.R.C., "3rd Office Action," Application No. 201110435619.1, Jan. 22, 2017, 15 pages, publisher SIPO, Beijing Shi, China.
Notice of Preliminary Rejection dated Jul. 26, 2016 in connection with Japanese Application No. 2011-281311, 11 pgs.
Second Office Action dated Jul. 7, 2016 in connection with Chinese Application No. 201110435619.1, 24 pages.
Notice of Preliminary Rejection dated Aug. 31, 2016 in connection with Korean Application No. 10-2010-0137448, 10 pages.
Foreign Communication From a Related Counterpart Application, Korea Application No. 10-2010-0137448, Notice of Preliminary Amendment dated Mar. 29, 2017, 11 pages.
Notice of Final Rejection regarding Korean Patent Application No. 10-2010-0137448, dated Sep. 26, 2017, 8 pages.
European Patent Office Communication regarding Application No. 11193370.1, dated Feb. 6, 2018, 6 pages.
Communication from a foreign patent office in a counterpart foreign application, European Patent Office, "Summons to attend oral proceedings pursuant to Rule 115(1) EPC," Application No. EP 11193370.1, Sep. 21, 2018, 7 pages.

* cited by examiner

APPARATUS AND METHOD FOR CONTROLLING A SCREEN DISPLAY IN PORTABLE TERMINAL

CROSS-REFERENCE TO RELATED APPLICATION(S) AND CLAIM OF PRIORITY

The present application is a continuation of U.S. patent application Ser. No. 13/335,687, filed Dec. 22, 2011, which is related to and claims priority under 35 U.S.C. § 119(a) to a Korean patent application filed in the Korean Intellectual Property Office on Dec. 29, 2010 and assigned Serial No. 10-2010-0137448, the contents of which are incorporated by reference into the present disclosure as if fully set forth herein.

TECHNICAL FIELD OF THE INVENTION

The present invention relates to portable terminals, and more particularly, to an apparatus and method for controlling a screen display magnification of a portable terminal.

BACKGROUND OF THE INVENTION

The use of portable terminals has expanded due largely in part to their convenience. Thus, service providers (i.e., system manufacturers) have responded by developing portable terminals having convenient functions.

For example, certain portable terminals now provide functions, such as phone books, games, schedulers, Short Message Services (SMSs), Multimedia Message Services (MMS), Broadcast Message Services (BMSs), Internet services, electronic mail (e-mail) messages, morning wakeup calls, MPEG-1 Audio Layer 3 (MP3), digital cameras, and the like.

Portable terminals have also been developed to include touch screen panels that provide a means of inputting information. Portable terminals equipped with touch screen panels as the input means may also include functions for controlling the display of the screen, such as zooming in or zooming out the display of the screen. In some cases, this may be provided using a multi-touch function.

The method for using the multi touch function includes recognizing two points touched by user's two fingers and, according to a distance change between the two touch points, zooming in or out a screen display. That is, the multi touch function performs screen zoom-in and out according to a distance change between two fingers touching a screen, so a user has to repeat several times an operation of touching the screen with the fingers, zooming in or out the screen up to a desired level, and separating the fingers from the screen. Repeating the above operation requires a plurality of times of user's input for screen zoom-in and out, and in certain cases, cause undue strain on the surface of the touch screen panel.

Also, a problem may occur where, in certain cases where the user performs the screen zoom-in and out using the multi touch method, the user is inhibited from performing a screen scroll operation at the same time of an operation for zoom-in/out.

Accordingly, there is a need for a screen zoom-in and out function for solving the problem of the multi touch method in a portable terminal.

SUMMARY OF THE INVENTION

To address the above-discussed deficiencies of the prior art, it is a primary object to provide at least the advantages below. Accordingly, one aspect of the present invention is to provide an apparatus and method for improving a screen-display magnification control performance of a portable terminal.

Another aspect of the present invention is to provide an apparatus and method for controlling a magnification of a screen display using a tilt in a portable terminal.

A further aspect of the present invention is to provide an apparatus and method for improving a selectivity of a link item included in a screen display in a portable terminal.

Yet another aspect of the present invention is to provide an apparatus and method for zooming in and displaying a link item and receiving a selection of the link item in a portable terminal.

Still another aspect of the present invention is to provide an apparatus and method for determining zoom-in or a zoom-out of a link item dependent on a screen display magnification in a portable terminal.

The above aspects are achieved by providing an apparatus and method for controlling a screen display in a portable terminal.

In accordance with an aspect of the present invention, an apparatus for controlling a screen display in a portable terminal is provided. The apparatus includes a display unit, an input unit, a memory unit, a magnification identifying unit, and a controller. The display unit displays a screen display having a controlled magnification level. The input unit sets a zoom-in or zoom-out point on the screen display. The memory unit stores reference information for determining a zoom-in or zoom-out magnification level of the screen display. The magnification identifying unit measures a tilt of the portable terminal, and determines control or non-control of a magnification level of the screen display using the measured tilt. The controller controls the screen display according to the magnification level identified by the magnification identifying unit.

In accordance with another aspect of the present invention, a method for controlling a screen display in a portable terminal is provided. The method includes setting a zoom-in or zoom-out point in the screen display, measuring a tilt of the portable terminal, determining control or non-control of a magnification level of the screen display and a display for the magnification level using the measured tilt of the portable terminal. The method further includes controlling the screen display according to the determined display magnification level, and displaying the screen display at the controlled magnification level.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE PREFERRED EMBODIMENTS

FIGS. 1 through 6C, discussed below, and the various embodiments used to describe the principles of the present disclosure in this patent document are by way of illustration only and should not be construed in any way to limit the scope of the disclosure.

Certain embodiments of the present invention will be described herein below with reference to the accompanying drawings. In the following description, well-known functions or constructions are not described in detail since they would unnecessarily obscure the detail of the invention.

Figure 1:
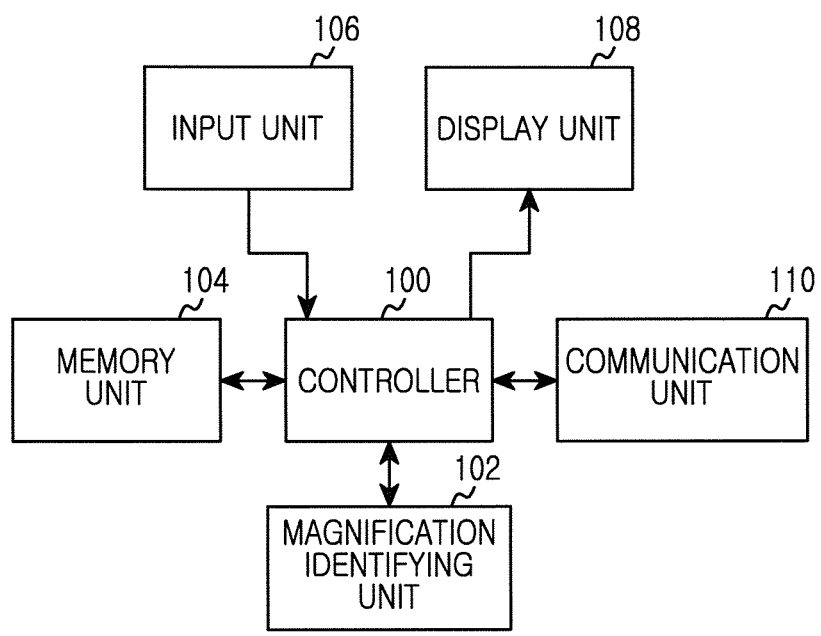
FIG. 1 illustrates an example portable terminal for adjusting a magnification of a screen display using tilting according to the present invention.

FIG. 1 illustrates an example portable terminal for adjusting a magnification of a screen display using tilting according to one embodiment of the present invention.

Referring to FIG. 1, the portable terminal includes a controller 100, a magnification identifying unit 102, a memory unit 104, an input unit 106, a display unit 108, and a communication unit 110.

The controller 100 of the portable terminal controls general operation of the portable terminal. For instance, the controller 100 performs processing and control for voice calls and data communication of the portable terminal. Further, the controller 100 uses screen display zoom-in/out using tilting of a portable terminal according to the present invention. In certain embodiments, this may provide a solution to a problem of screen display zoom-in/out when used in conjunction using an existing multi finger touch.

That is, the controller 100 measures a tilt of a portable terminal and identifies if the extent of the measured tilt is a tilt for screen display zoom-in or a tilt for screen display zoom-out. Further, the controller 100 identifies a zoom-in or zoom-out magnification using the measured tilt.

At this time, the controller 100 may display a zoom gauge for indicating the zoom-in or zoom-out magnification identified through the tilt to display a changed screen magnification. If the magnification of the screen display is determined, the controller 100 makes the displayed zoom gauge disappear. Due to this, a user of the portable terminal can recognize that the screen magnification indicated before the zoom gauge disappears is set as a magnification of a screen display.

The magnification identifying unit 102 may include a sensing unit for measuring a tilt of the portable terminal under control of the controller 100, and can determine the tilt of the portable terminal using sensing information acquired through the sensing unit. After that, the magnification identifying unit 102 can identify a magnification of a screen display to be changed using the determined tilt.

The memory unit 104 includes any suitable type of volatile or non-volatile storage, such as a Read Only Memory (ROM), a Random Access Memory (RAM), and a flash ROM. The memory stores instructions of a program for processing and controlling the controller 100 and the magnification identifying unit 104. In some cases, the memory may store a variety of reference data.

The RAM, a working memory of the controller 100, stores temporary data generated in execution of a variety of programs. The flash ROM stores a diversity of updateable data such as a phone book, an incoming/outgoing message, meta data, and a data storage database, and stores reference information for determining a zoom-in or zoom-out magnification level of the screen display according to the present invention.

The input unit 106 may include numeric key buttons '0' to '9', a menu button, a cancel button, an OK button, a talk button, an end button, an Internet button, navigation key (or direction key) buttons, and a plurality of function keys such as a character input key. The input unit 106 provides key input data corresponding to a key pressed by a user to the controller 100. Also, the input unit 106 provides the controller 100 with a user's input setting a zoom-in or zoom-out point in the screen display according to the present invention.

The display unit 108 displays information generated during operation of the portable terminal, such as characters, moving pictures, still pictures, and the like and may also display a screen having an adjustable magnification level according to the present invention. The display unit 108 can be a color Liquid Crystal Display (LCD), an Active Matrix Organic Light Emitting Diode (AMOLED), and the like. In a particular embodiment in which the display unit 108 includes a touch input device, the display unit 108 can be used as an input device.

The communication unit 110 transmits and receives wireless signals modulated with data input/output through an antenna (not illustrated). For example, in a transmission mode, the communication unit 110 processes data through channel coding and spreading, converts the data into a Radio Frequency (RF) signal, and transmits the RF signal. In a reception mode, the communication unit 110 converts received RF signals into baseband signals by processing the baseband signal through de-spreading and channel decoding to restore the baseband data.

A role of the magnification identifying unit 102 can be implemented by the controller 100 of the portable terminal. Although these elements are shown separately in the present embodiment for convenience of description, other embodiments may be implemented without limiting the scope of the present invention. It should be understood by those skilled in the art that various modifications can be made within the scope of the present invention. For example, the controller 100 may be used to process all elements shown in FIG. 1.

Figure 2:
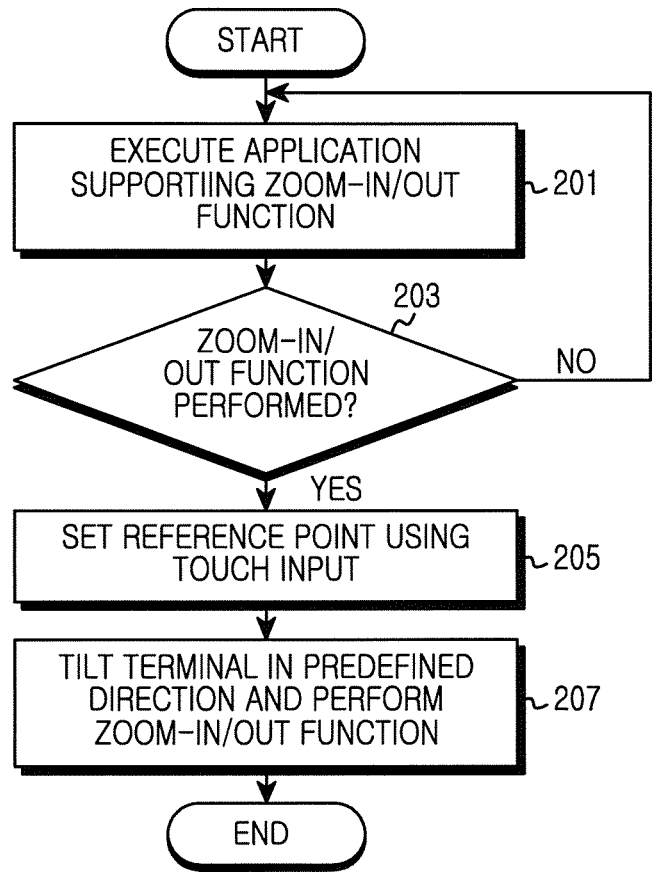
FIG. 2 illustrates an example process for controlling a magnification of a screen display using a portable terminal according to an embodiment of the present invention.

FIG. 2 illustrates an example process of controlling a magnification of a screen display using a portable terminal according to an embodiment of the present invention.

Referring to FIG. 2, in step 201, a user of a portable terminal executes an application supporting a zoom-in or zoom-out function. Here, the application supporting the zoom-in or zoom-out function can be any type, such as an Internet browser, an electronic book (e-book) viewer, an image viewer, and the like.

In step 204, the user of the portable terminal identifies whether to perform a function of zooming in or zooming out the screen display.

If determining not to perform the function of zooming in or zooming out the screen display in step 203, processing reverts back to step 201.

Alternatively, if the user decides to perform the function of zooming in or zooming out the screen display in step 203, the user sets a reference point using a touch input at step 205. Here, the reference point represents an initial point from which a zoom in or zoom out level is performed. On a basis of the reference point (i.e., a point where a user's touch input occurs), the portable terminal processes to zoom in or out a predetermined region of the screen display.

In step 207, the user of the portable terminal tilts the terminal in a predefined direction and performs the zoom-in or zoom-out function. That is, the portable terminal can control a magnification level of a screen display according to the extent and direction of user's tilting of the portable device.

Next, the algorithm as shown in FIG. 2 is completed.

Figure 3A:
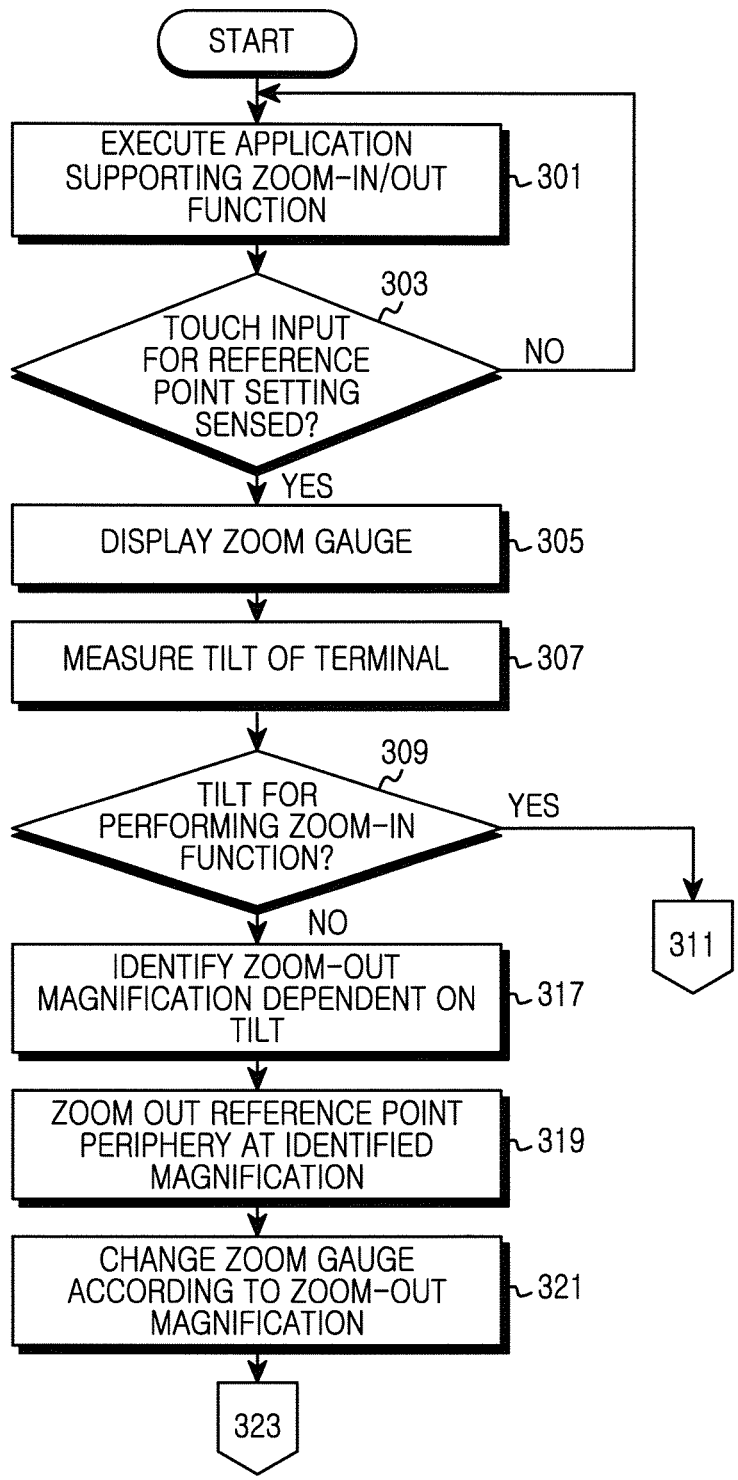
FIGS. 3A and 3B illustrate an example process for controlling a magnification of a screen display according to user's tilting in a portable terminal according to an embodiment of the present invention.
Figure 3B:
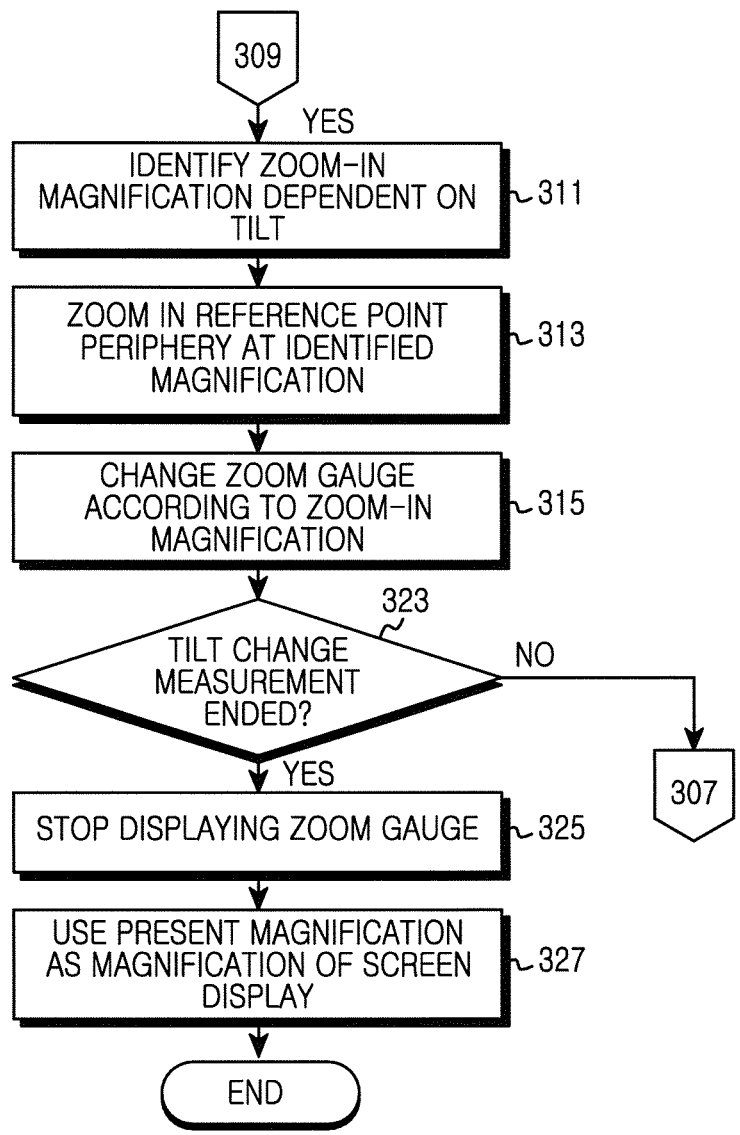

FIGS. 3A and 3B illustrate an example process for controlling a magnification of a screen display according to a tilting action of a portable terminal according to an embodiment of the present invention.

Referring to FIGS. 3A and 3B, in step 301, the portable terminal executes an application supporting a zoom-in or zoom-out function. Here, the application supporting the zoom-in or zoom-out function can be any suitable type, such as an Internet browser, an e-book viewer, an image viewer, an electronic newspaper viewer, and the like.

In step 303, the portable terminal determines whether a touch input for setting a reference point is sensed. This touch input generally refers to a reference point from which the screen display may be zoomed in or zoomed out.

If the touch input is not sensed in step 303, processing reverts back to step 301.

Alternatively, if the touch input is sensed in step 303, the portable terminal displays a zoom gauge on the screen display in step 305. Here, the zoom gauge may include a gauge for indicating a magnification of a screen display. As the zoom gauge increases, the screen display may be displayed at a higher level of magnification and, as the zoom gauge decreases, the screen display may be displayed at a reduced magnification. In this manner, the user of the portable terminal can control the displayed zoom gauge to control the magnification of the screen display.

In step 307, the portable terminal measures a tilt of a present state of the portable terminal. This may indicate a reference value of the tilt of the portable terminal for control of a magnification of a screen display.

In step 309, the portable terminal determines if any subsequent tilting action is sensed in addition to the tilt sensed in step 307.

If an additional tilt is sensed in step 309, the portable terminal identifies a screen display zoom-in amplification dependent on the measured tilt in step 311.

In step 313, the portable terminal zooms in to a reference point periphery at the magnification identified in step 309. In step 315, the portable terminal changes a previously displayed zoom gauge according to the zoom-in magnification identified in step 309. In this manner, the portable terminal may display a current zoom-in magnification level of the screen display using the zoom gauge.

Alternatively, if the portable terminal identifies a tilting action indicating the use intends to zoom out the screen display in step 309, the portable terminal identifies a screen display zoom-out amplification dependent on the measured tilt in step 317.

IN step 319, the portable terminal zooms out the reference point periphery at the identified magnification. In step 321, the portable terminal changes a previously displayed zoom gauge according to the zoom-out magnification. That is, the portable terminal shows a present zoom-out magnification of the screen display using the changed zoom level identified in step 317. At this time, a numerical value (i.e., a magnification level) of the zoom gauge changes according to a tilt change is displayed until the tilt of the terminal is fixed.

In certain embodiments, the portable terminal can arrange and store zoom-in and out magnification levels dependent on user's tilting as shown in Table 1.

TABLE 1

| Terminal operation mode | Change of tilt of X axis | Operation | Change of tilt of Y axis | Operation |
| --- | --- | --- | --- | --- |
| Horizontal mode | + (increase) | Zoom-in | + (increase) | No operation |
|  | − (decrease) | Zoom-out | − (decrease) | No operation |
| Vertical mode | + (increase) | No operation | + (increase) | Zoom-in |
|  | − (decrease) | No operation | − (decrease) | Zoom-out |

The portable terminal may distinguish tilt information for changing a magnification of a screen display according to a terminal operation mode. That is, the portable terminal operating in a horizontal mode can determine a tilt action using X-axis sensing information and then control the magnification of the screen display, and the portable terminal operating in a vertical mode can determine a tilt action using Y-axis sensing information and then control the magnification of the screen display. Also, an increased change could represent that the portable terminal is tilted toward a user.

After changing the zoom gauge according to the zoom-in or zoom-out magnification as described above, the portable terminal identifies if a tilt change measurement for the terminal is ended in step 323. That is, the portable terminal identifies if a sensed tilt action indicates that a magnification of a present screen display is suitable and finishes a process of tilting of the terminal. For example, the adjustment of the magnification level may be finished if the portable terminal senses that the tilt action does not change over a specified period of time.

Alternatively, if the portable terminal identifies the sensed tilt change measurement for the terminal is not ended in step 323, the portable terminal continues processing at step 307 to provide further adjustment of the magnification level.

That is, if the tilt change measurement for the terminal is ended in step 323, i.e., if the tilt is fixed, the portable terminal stops displaying the zoom gauge in step 325. In certain embodiments where the tilt change is not measured during a predetermined time in a tilt dependent magnification control process, the portable terminal makes a previously displayed zoom gauge disappear.

In step 327, the portable terminal uses a present magnification level as a magnification of a screen display. At this point the process as shown in FIGS. 3A and 3B ends.

Figure 4:
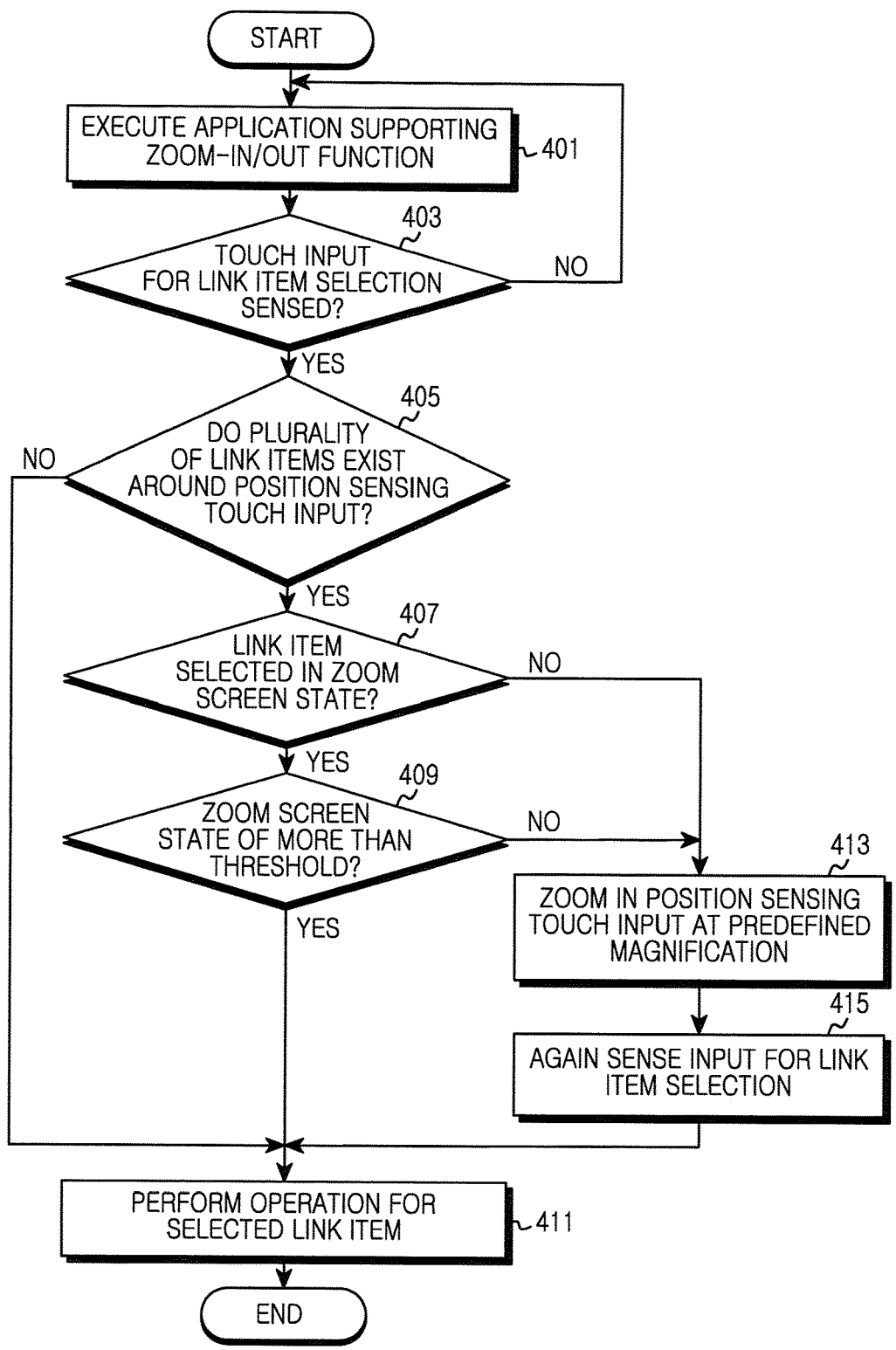
FIG. 4 illustrates an example process of link selection of a portable terminal according to an embodiment of the present invention.

FIG. 4 illustrates an example process of link selection in a portable terminal according to an embodiment of the present invention.

Referring to FIG. 4, the link selection process refers to a process of receiving a selection of a link included in a screen display of the portable terminal, from a user.

In step 401, the portable terminal executes an application supporting a zoom-in or out function. Here, the application supporting the zoom-in or out function can include an Internet browser, an e-book viewer, an image viewer, an electronic newspaper viewer, and the like. At this time, the portable terminal may display a page including a plurality of links. The link may be any suitable type, such as, for example, a hypertext link or a hyperlink.

In step 403, the portable terminal identifies whether a touch input for a link item is sensed.

If the portable terminal does not sense a touch input for a link item, processing reverts back to step 401.

Alternatively, if a touch input for a link item is identified in step 403, the portable terminal identifies if a plurality of link items exist at least proximate a position of the touch input in step 405. This may indicate, for example, if a situation occurs in which a user of the portable terminal inaccurately selects a link item included in a range of a restricted size. In this manner, the portable terminal can determine that the user's touch input may be inaccurate if multiple link items exist.

If the portable terminal identifies that only one link item exists proximate the position of the touch input in step 405, the portable terminal continues processing at step 411 and performs an operation for the link item selected by the user. For example, the portable terminal can display a page linked with a corresponding link, as the operation for the link item.

Alternatively, if the portable terminal identifies that the multiple link items exist proximate the position of the touch input in step 405, the portable terminal identifies if it receives a selection of a link item in a zoom screen state at step 407. That is, the portable terminal identifies whether a situation occurs in which the user of the portable terminal inaccurately selects a link item included in a range of a restricted size, in a similar manner to step 405.

If the portable terminal identifies that a situation occurs in which the user selects a link item in a non-zoom screen state in step 407, the portable terminal zooms in at the position of the touch input at a specified magnification and displays a previously displayed link item.

In step 415, the portable terminal senses a touch input for a link item selection and then, continues processing at step 411 as described above. That is, the portable terminal again senses a touch input for a user's selection using an increased magnification.

Alternatively, if the portable terminal identifies that a situation occurs in which the user selects the link item in the zoom screen state in step 407, the portable terminal continues processing at step 409 in which it identifies if the selected link item is in a zoom screen state of more than a specified threshold. At this time, the portable terminal can distinguish magnifications between a minimum zoom magnification and a maximum zoom magnification from multiple levels and, on a basis of a zoom screen state of more than a predetermined level, the portable terminal can determine if a user accurately selects a link item. For one example, the portable terminal can distinguish zoom magnifications as in Table 2 below, and detect the accuracy of link item selection.

TABLE 2

| Magnifications | Levels | Comparison |
| --- | --- | --- |
| 0.4 to 1.0 | Level one | Abnormal selection possible |
| 1.0 to 2.0 | Level two | Abnormal selection possible |
| 2.0 to 3.0 | Level three | Normal selection possible |
| 3.0 to 4.0 | Level four | Normal selection possible |

Here, the portable terminal controls a magnification of a screen display between a minimum magnification '0.4' to a maximum magnification '4.0'. It has been determined that user's link item selection at a three-level magnification or more can be relatively accurate.

If the portable terminal identifies that a touch input provided by a user inaccurately selects a link item in step 409, for example, if the portable terminal identifies that the user selects the link item in a zoom screen state of less than a predetermined level, the portable terminal continue processing at step 413 and zooms in a position proximate a touch input at a specified magnification and a previously displayed link item and then the portable terminal continues processing at step 415 and again sense a touch input for a link item selection.

Alternatively, if the portable terminal identifies that a user inaccurately selects a link item in step 409, for example, the user selects the link item in a zoom screen state of more than a specified level, the portable terminal determines that user's link item selection is accurate and then performs an operation for the link item selected by the user at step 411.

At this point, the process as shown in FIG. 4 is completed.

FIGS. 5A through 5D illustrate example screens for controlling a magnification of a screen display in a portable terminal according an embodiment of the present invention.

Figure 5B:
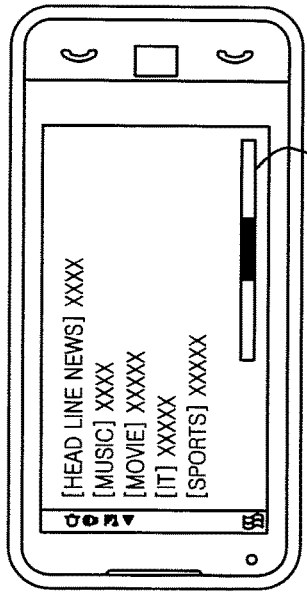
FIG. 5B illustrates an example screen for displaying a zoom gauge in a portable terminal according to an embodiment of the present invention.
Figure 5D:
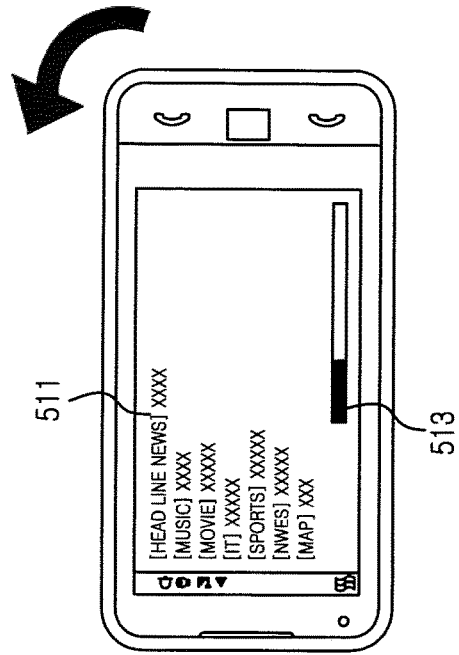
FIG. 5D illustrates an example screen for zooming out a screen display using a tilt in a portable terminal according to an embodiment of the present invention.
Figure 5A:
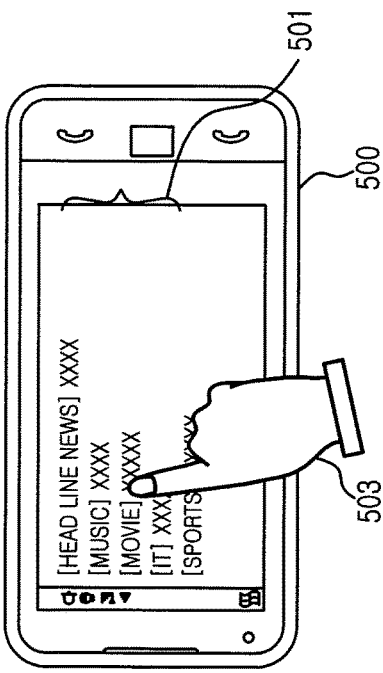
FIG. 5A is a diagram illustrating a screen of setting a reference point in a portable terminal according to a desirable exemplary embodiment of the present invention.

FIG. 5A illustrates an example screen for setting a reference point in a portable terminal according to an embodiment of the present invention.

Referring to FIG. 5A, the portable terminal 500 executes an application supporting a function of zooming in or out a screen display, such as an Internet browser, an e-book viewer, an image viewer, and an electronic newspaper viewer and then, displays the contents 501 corresponding to the application. According to this, a user of the portable terminal for controlling a magnification of the screen display sets a reference point 503 corresponding to a magnification control point using a touch input action.

FIG. 5B illustrates an example screen for displaying a zoom gauge in a portable terminal according to an embodiment of the present invention.

Referring to FIG. 5B, when a reference point is set by a user as shown in FIG. 5A, the portable terminal displays a zoom gauge 505 for indicating a zoom-in/out magnification level. At this time, the zoom gauge indicates a magnification level simultaneously as a user controls a magnification of a screen display. The user of the portable terminal can control the zoom gauge to adjust the magnification level of the screen display.

Figure 5C:
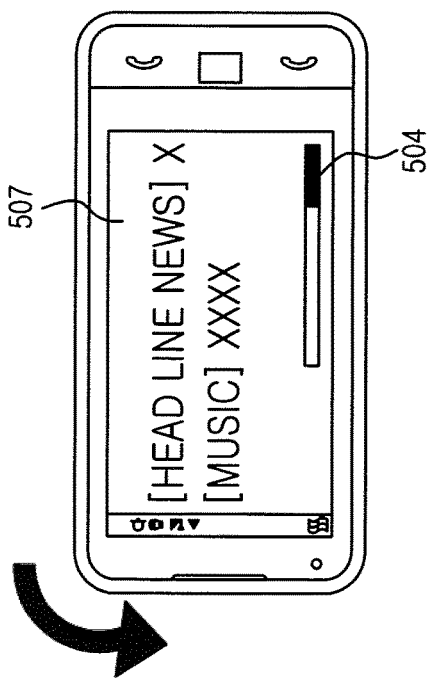
FIG. 5C illustrates an example screen for zooming in a screen display using a tilt in a portable terminal according to an embodiment of the present invention.

FIG. 5C illustrates an example screen for zooming in a screen display using a tilt in a portable terminal according to an embodiment of the present invention.

Referring to FIG. 5C, a user of the portable terminal can control a magnification of a screen display through tilting of a portable terminal according to the present invention.

At this time, if the portable terminal is in a horizontal mode, the portable terminal identifies a change of X-axis orientation and determines whether to zoom in or out the screen display.

That is, if the user pulls an upper side of a portable terminal in a horizontal mode toward himself/herself, the portable terminal will identify a change of X-axis orientation and, according to the changed orientation, the portable terminal can zoom in the screen display 507. Due to this magnification, the portable terminal may display less than the contents as displayed in the screen of FIG. 5A while zooming in and displaying the contents of a reference point periphery according to the extent of the change of the orientation, for example, according to the extent of tilting, and changes a magnification level 504 of a previously displayed zoom gauge according to a zoom-in magnification.

FIG. 5D illustrate an example screen for zooming out a screen display using a tilt in a portable terminal according to an embodiment of the present invention.

Referring to FIG. 5D, a user of the portable terminal can control a magnification of a screen display through tilting of the portable terminal according to the present invention. As the portable terminal is in a horizontal mode, the portable terminal identifies a change of X-axis orientation and determines whether to zoom in or out the screen display. If the portable terminal is in a vertical mode, the portable terminal can identify a change of Y-axis orientation to control a magnification of the screen display.

That is, if the user pushes out an upper side of the portable terminal of the horizontal mode from himself/herself, the portable terminal will identify a change of X-axis orientation and, according to the changed orientation, the portable terminal can zoom out the screen display 511. Due to this, the portable terminal displays more content than what is display on the screen of FIG. 5A while zooming out and displaying the contents of the reference point periphery according to the extent of the change of the sensing information, for example, according to the extent of tilting. Also, after zooming out the screen display, the portable terminal changes a magnification level 513 of a previously displayed zoom gauge according to a zoom-out magnification.

The zoom gauge changed according to the tilt of the terminal as illustrated in FIGS. 5A through 5D disappears when a tilt change of the terminal is less than a specified threshold. The portable terminal can set a magnification level before the zoom gauge disappears, as a magnification of a screen display.

Figure 6A:
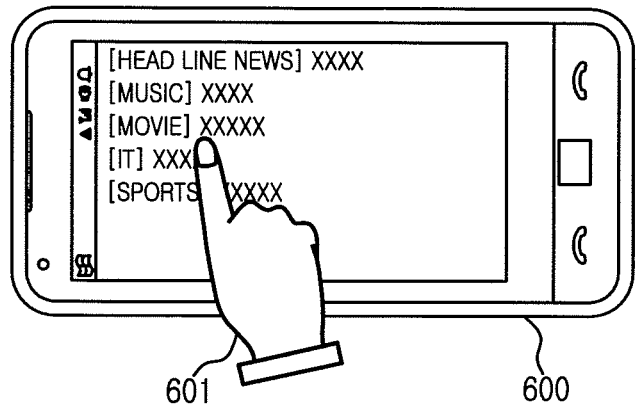
FIG. 6A illustrates an example screen for sensing a link item selection in a portable terminal according to an embodiment of the present invention.
Figure 6B:
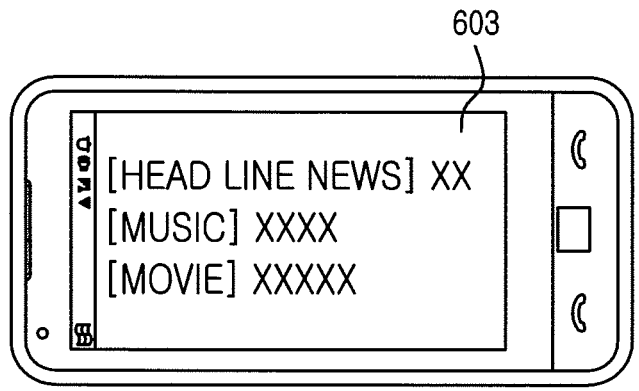
FIG. 6B illustrates an example screen for zooming in a link item existing around a user's touch input in a portable terminal according to an embodiment of the present invention.
Figure 6C:
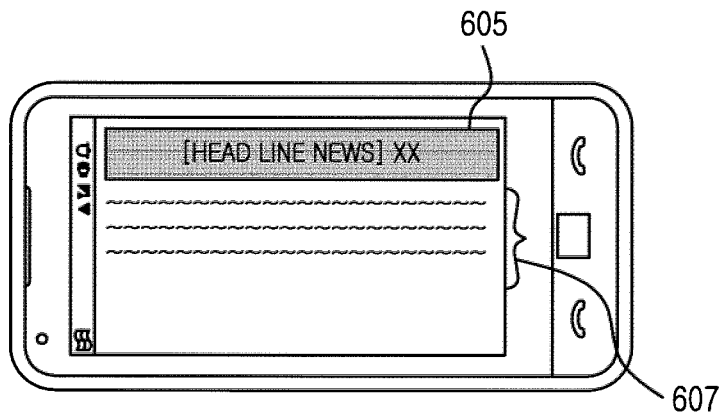
FIG. 6C illustrates an example screen for displaying the detailed contents of a link item selected by a user in a portable terminal according to an embodiment of the present invention.

FIGS. 6A through 6C illustrate multiple screens for controlling a selection of a link item in a portable terminal according to an embodiment of the present invention.

FIG. 6A illustrates an example screen for sensing link item selection in a portable terminal according to an embodiment of the present invention.

Referring to FIG. 6A, the portable terminal executes an application supporting a function of zooming in or out a screen display, such as an Internet browser, an e-book viewer, an image viewer, and an electronic newspaper viewer. The portable terminal may then display the contents according to execution of the application. If the executed application is an electronic newspaper viewer, the portable terminal 600 displays multiple link items and then, provides detailed news on an item selected by a user.

Accordingly, as illustrated, a user of the portable terminal will select a link item 601 about concerned news among the displayed link items.

FIG. 6B illustrates an example screen for zooming in a link item existing around a user's touch input in a portable terminal according to an embodiment of the present invention.

Referring to FIG. 6B, in a case where a user selects a link item included in a screen display as shown in FIG. 6A, it can occur that, because a space between link items is narrow, he/she may fail to accurately select the desired link item that the user intends to select because spacing between the multiple link items is narrow relative to the size of the user's finger.

Certain embodiment of the portable terminal may determine that inaccurate link item selection occurs in the following circumstances.

First, in a case where a space between link items is narrow, the portable terminal determines that the inaccurate link item selection has occurred by determining that the screen display is not zoomed in.

Second, the screen display can be a state in which is sufficiently zoomed in to accurately distinguish link items.

Accordingly, in a case where the portable terminal identifies that the inaccurate link item selection occurs, the portable terminal zooms in and displays a region 603 of a predefined range on a basis of a periphery of a link item selected by a user and again performs a process of link item selection by the user.

That is, as illustrated, the portable terminal zooms in to include only some of the link items illustrated in FIG. 6A, improving the accuracy of user's selection.

FIG. 6C illustrates an example screen for displaying the detailed contents of a link item selected by a user in a portable terminal according to an embodiment of the present invention.

Referring to FIG. 6C, certain embodiments of the portable terminal can improve the accuracy of a link item selection process through an operation as shown in FIG. 6B.

By allowing a user to reselect an desired link item among the zoomed-in link items of FIG. 6B, the portable terminal can display the detailed contents of the selected link item as illustrated. The drawing illustrates displaying a title 605 of the link item selected by the user and an article 607 related to the title 605 together on the screen display.

Due to this, in a case where the user of the portable terminal erroneously selects a link item, the portable terminal can search the contents of a link item more conveniently than what is provided by a conventional method of performing a process of again selecting a normal link item after performing a cancel process.

As described above, the present invention relating to an apparatus and method for controlling a screen display in a portable terminal, controls a magnification level of a screen display by tilting a portable terminal. Additionally, the portable terminal may zoom in and display a link item according to the screen display magnification level, thus improving the control performance of the magnification of the screen display and improving a selectivity of the link item in certain embodiments.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus comprising:
a memory configured to store instructions;
a display; and
a processor that is, when executing the instructions, configured to:
present, via the display, at least a portion of a first web page including a plurality of objects, wherein each of the plurality of objects represent a new web page distinct from the first web page;
receive a first touch input on a first object among the plurality of objects included in the first web page;
in response to receiving the first touch input, determine whether a second object among the plurality of objects is within a specified distance from the first object on which the first touch input is received;
in response to determining that the second object is within the specified distance:
present, via the display, an area as enlarged, the area including the first object and the second object, and
receive, within the area, a second touch input with respect to the first object or the second object,
in response to receiving the second touch input on the first object or the second object, switch at least the portion of the first web page including the area presented as enlarged to a second web page corresponding to the first object or a third web page corresponding to the second object, based on whether the second touch input is on the first object or the second object; and
in response to determining that the second object is outside of the specified distance, switch, via the display, at least the portion of the first web page to the second web page corresponding to the first object on which the first touch input is received.

2. The apparatus of claim 1, wherein the processor, when executing the instructions, is further configured to:
in response to receiving the first touch input, identify whether a magnification in which presenting the at least the portion of the first web page is less than a specified magnification; and
in response to identifying that the magnification is less than the specified magnification, determine whether the second object among the plurality of objects is within the specified distance from the first object on which the first touch input is received.

3. The apparatus of claim 2, wherein the processor, when executing the instructions, is further configured to:
in response to identifying that the magnification is larger than or equal to the specified magnification, switch, via the display, the at least the portion of the first web page to the second web page corresponding to the first object on which the first touch input is received.

4. An apparatus comprising:
a memory configured to store instructions;
a display; and
a processor that is, when executing the instructions, configured to:
present, via the display, at least a portion of a first web page including a plurality of objects, wherein each of the plurality of objects represents a new web page distinct from the first web page;
receive a first touch input on a first object among the plurality of objects included in the first web page;
in response to receiving the first touch input, determine whether a magnification in which presenting the at least the portion of the first web page is less than a specified magnification;
in response to determining that the magnification is less than the specified magnification:
present, via the display, an area as enlarged, the area including the first object and a second object among the plurality of objects, wherein the first object and second object are presented in the area when the second object is located in proximity to the first object, and
receive, within the area, a second touch input with respect to the first object or the second object,
in response to receiving the second touch input on the first object or the second object, switch at least the portion of the first web page including the area presenting as enlarged to a second web page corresponding to the first object or a third web page corresponding to the second object, based on whether second touch input is on the first object or the second object; and
in response to determining that the magnification is larger than or equal to the specified magnification, switch, via the display, at least the portion of the first web page to the second web page corresponding to the first object on which the first touch input is received.

5. The apparatus of claim 4, wherein the processor, when executing the instructions, is further configured to:
in response to receiving the first touch input, identify whether the second object among the plurality of objects is within a specified distance from the first object on which the first touch input is received; and
in response to identifying that the second object is within the specified distance, determine whether the magnification is less than the specified magnification.

6. The apparatus of claim 5, wherein the processor, when executing the instructions, is further configured to:
in response to identifying that the second object is outside of the specified distance, switch, via the display, the at least the portion of the first web page to the third web page corresponding to the first object on which the first touch input is received.

7. An apparatus comprising:
a display; and
a processor configured to:
present, via the display, content including a first object and a second object, the first object representing first link information and the second object representing second link information, wherein the second object is located in proximity to the first object;
receive a first user input for selecting the first object included in the content as presented via the display;
identify whether a zoom screen state of the content including the first object and the second object is a first zoom screen state or a second zoom screen state that presents the content in a higher magnification than the first zoom screen state;

in response to identifying that the zoom screen state is the first zoom screen state, present, via the display, the first object and the second object as enlarged;

while the first object and the second object are presented as enlarged, receive a second user input with respect to either the first object or the second object;

in response to receiving the second user input on the first object being presented as enlarged, present a first content indicated by the first link information; and in response to receiving the second user input on the second object being presented as enlarged, present a second content indicated by the second link information.

8. The apparatus of claim 7, wherein the processor is further configured to:

identify that the zoom screen state is the second zoom screen state; and in response to identifying that the zoom screen state is the second zoom screen state, present, via the display, the first content indicated by the first link information.

9. The apparatus of claim 8, wherein the processor is configured to:

receive the first user input;

based on receiving the first user input, identify whether the zoom screen state of the content is the first zoom screen state or the second zoom screen state and identify whether the second object is located within a specified distance from the first object selected by the first user input; and in response to identifying that the zoom screen state is the first zoom screen state and identifying that the second object is located within the specified distance from the first object, present, via the display, the first object and the second object as enlarged.

10. The apparatus of claim 9, wherein the processor is configured to:

present, via the display, the first content by switching the content to the first content based on the second user input on the first object being displayed as enlarged.

11. The apparatus of claim 10, wherein the processor is configured to:

present, via the display, the second content by switching the content to the second content based on the second user input on the second object being displayed as enlarged.

12. A non-transitory computer readable storage medium having a computer readable program stored therein, wherein the computer readable program, when executed on at least one processor, configures the at least one processor to:

present at least a portion of a first web page including a plurality of objects, wherein each of the plurality of objects represent a new web page distinct from the first web page;

receive a first touch input on a first object among the plurality of objects included in the first web page;

in response to receiving the first touch input, determine whether a second object among the plurality of objects is within a specified distance from the first object on which the first touch input is received;

in response to determining that the second object is within the specified distance:

present an area including the first object and the second object as enlarged, and receive, within the area, a second touch input with respect to the first object or the second object, in response to receiving the second touch input on the first object or the second object, switch at least the portion of the first web page including the area presented as enlarged to a second web page corresponding to the first object or a third web page corresponding to the second object, based on whether the second touch input is on the first object or the second object; and in response to determining that the second object is outside of the specified distance, switch the at least the portion of the first web page to the second web page corresponding to the first object on which the first touch input is received.

* * * * *